(12) United States Patent
Wu et al.

(10) Patent No.: US 6,507,888 B2
(45) Date of Patent: Jan. 14, 2003

(54) SDR AND DDR CONVERSION DEVICE AND ASSOCIATED INTERFACE CARD, MAIN BOARD AND MEMORY MODULE INTERFACE

(75) Inventors: Kun Ho Wu, Feng-Shan (TW); Hai Feng Chuang, Tainan (TW); Chun Ta Chiang, Taichung (TW)

(73) Assignee: Leadtek Research Inc., Taipei Hsien (TW)

( * ) Notice: Subject to any disclaimer, the term of this patent is extended or adjusted under 35 U.S.C. 154(b) by 179 days.

(21) Appl. No.: 09/777,228

(22) Filed: Feb. 5, 2001

(65) Prior Publication Data

US 2002/0087819 A1 Jul. 4, 2002

(30) Foreign Application Priority Data

Jan. 3, 2001 (TW) ........................................ 90100095 A

(51) Int. Cl.[7] .............................................. G06F 12/00
(52) U.S. Cl. ........................................ 711/105; 711/167
(58) Field of Search ................................... 711/105, 167

(56) References Cited

U.S. PATENT DOCUMENTS 6,337,832 B1 * 1/2002 Ooishi et al. ................ 365/233
2001/0039602 A1 * 11/2001 Kanda et al. ................ 711/105
2002/0042898 A1 * 4/2002 Jones et al. .................. 714/744

FOREIGN PATENT DOCUMENTS

GB 2332964 * 7/1999

* cited by examiner

*Primary Examiner*—Jack A. Lane
(74) *Attorney, Agent, or Firm*—J.C. Patents

(57) ABSTRACT

An SDR and DDR conversion device and associated interface cards, motherboards and memory module interfaces. The SDR and DDR conversion device includes a DDR interface device, an SDR interface device and a core conversion device. The DDR interface device exchanges signals with the DDR device while the SDR interface device exchanges signals with the SDR device. The core conversion device converts DDR instructions and data into SDR instructions and data and vice versa.

14 Claims, 4 Drawing Sheets

SDR AND DDR CONVERSION DEVICE AND ASSOCIATED INTERFACE CARD, MAIN BOARD AND MEMORY MODULE INTERFACE

CROSS-REFERENCE TO RELATED APPLICATION

This application claims the priority benefit of Taiwan application serial no. 90100095, filed Jan. 3, 2001.

BACKGROUND OF THE INVENTION

1. Field of Invention

The present invention relates to a memory conversion device, and associated devices. More particularly, the present invention relates to a synchronous dynamic random access memory (SDRAM), and double data rate synchronous dynamic random access memory (DDR SDRAM) conversion device, and associated interface card, main board, memory module, portable computer main board and portable computer memory module.

2. Description of Related Art

Due to rapid progress in computer fabricating techniques, the processing speed of central processing units (CPU) has increased considerably. Such a rapid change in the processing speed of CPU has also lead to some changes in the basic requirements of memory. Besides having a high memory capacity, commonly used memory must have a fast access speed. Earlier types of memories including dynamic random access memory (DRAM), and extended data output random access memory (EDO RAM), has been gradually replaced by faster synchronous dynamic random access memory (SDRAM). In recent years, an even faster type of memory known as double data rate (DDR) SDRAM has been brought to market. This DDR SDRAM has enjoyed a rapid growth in the electronic industry.

Although innovative techniques that increase the operating speed of a memory device have many benefits, it also leads to new kinds of defects. One obvious defect is the rapid replacement of old devices. Due to the appearance of DDR SDRAM (hereafter DDR for short), SDRAM (hereafter SDR for short) is gradually being replaced. However, the price of DDR products is still considerably above the price of SDR products. Consequently, conversion devices that render both SDR and DDR products useful have been developed. At present, most DDR and SDR conversion devices can use SDR or DDR only. In general, these conversion devices forbid the use of both SDR and DDR at the same time. Hence, a memory purchaser is faced with a memory conformity problem.

Nowadays, most chip manufacturers claim their products can support both SDR and DDR modules. In practice, one needs to reset the conversion mode before the other type of memory module can be used. To support DDR modules, the supporting mode must be switched to DDR. Once the DDR mode is selected, SDR modules can no longer be used. Similarly, to support SDR modules, the supporting mode must be switched to SDR. Again, the DDR modules cannot be used once the SDR mode is selected. In other words, although the chip can accommodate both the SDR and the DDR modules, only one type of memory modules can be used through a preliminary selection. It is impossible to use both the SDR and the DDR modules at the same time.

SUMMARY OF THE INVENTION

Accordingly, one object of the present invention is to provide a synchronous dynamic random access memory (SDR) and double data rate synchronous dynamic random access memory (DDR) conversion device, and associated interface card, main board, and memory module interface. The conversion device provides supports such that various other devices including an interface card, main board and portable computer motherboard can use SDR and DDR modules at the same time without any memory conformity problem.

To achieve these and other advantages and in accordance with the purpose of the invention, as embodied and broadly described herein, the invention provides an SDR and DDR conversion device. The conversion device includes a DDR interface device, an SDR interface device, a clock controller, an instruction controller, a state register set, and a data conversion device. The DDR interface device exchanges signals with the DDR device, while the SDR interface device exchanges signals with the SDR device. The clock controller receives the clock signal from the DDR device and converts the signal into a clock signal suitable for operating between the conversion device and the SDR device. The clock controller also provides an internal clocking signal for the conversion device. The instruction controller picks up and converts the DDR instructions to SDR instructions. The data conversion device is triggered when a data read/write instruction is executed. The state register set is used for holding the data held by a mode register set (MRS) and an extended mode register set (EMRS) inside the DDR interface during operation. The state register set also provides conversion data to the instruction controller for carrying out appropriate instruction and data conversion. The data conversion device is responsible for transforming DDR data into an SDR data mode, and vice versa.

In one preferred embodiment of this invention, the data conversion device includes a data mask and strobe controller, a DDR-to-SDR data converter, and an SDR-to-DDR data converter. The data mask and strobe controller receives a DDR data mask signal (DM signal) and a DDR data strobe signal (DQS signal) from the DDR device. Inside the data mask and strobe controller, the DDR data mask signal is converted to an SDR mask signal (DQM) while the DDR data strobe signal is converted to a data signal for accessing a SDR device. In addition, the data mask and strobe controller are able to transmit a DDR data strobe signal to the DDR device according to the instruction provided by the instruction controller. The DDR-to-SDR data converter converts serial signal from the DDR device into a parallel signal and transmits the parallel signal to two separate SDR devices according to the instruction provided by the instruction controller. The SDR-to-DDR data converter converts data signals from two separate SDR devices into a serial signal and transmits the serial signal to the DDR device according to the instruction provided by the instruction controller.

In brief, this invention utilizes the establishment of a conversion channel between DDR and SDR modules so that the SDR modules can operate normally under a DDR supporting system or device. In other words, there is no need to convert the entire DDR supporting system or device into an SDR supporting system or device so that both SDR and DDR modules can operate concurrently.

For the user of the conversion device, new DDR modules need not be purchased in order to have DDR module efficiency. The existing SDR modules can be re-used in the system, thereby saving some cost for memory upgrading.

For semiconductor manufacturers, cheaper SDR chips can be used in printed circuit boards such as interface cards and motherboards if the conversion device of this invention is employed. Despite having cheaper SDR chips, the printed circuit board has a quality and performance equivalent to the one using the more expensive DDR chips.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
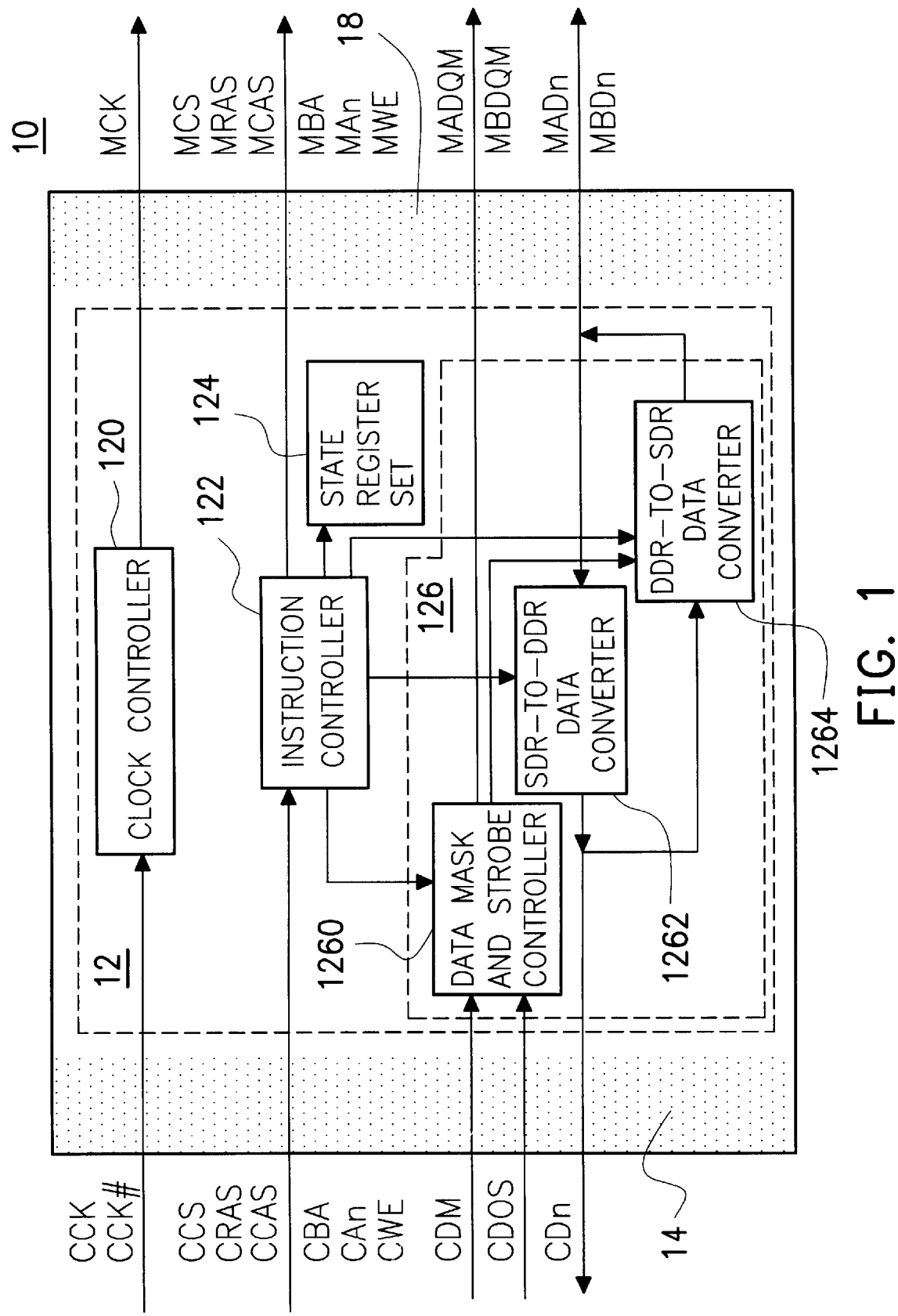
FIG. 1 is a block diagram showing a conversion device according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing a conversion device according to one preferred embodiment of this invention. As shown in FIG. 1, the synchronous dynamic random access memory (SDR) and double data rate synchronous dynamic random memory (DDR) device 10 includes a DDR interface device 14, an SDR interface device 18 and a core conversion device 12. The conversion device 10 is often referred to by the label "SDDR". The DDR interface device 14 exchanges signals with the DDR device while the SDR interface device 18 exchanges signals with the SDR device. Devices inside the core conversion device 12 and their interconnections are also shown in detail in FIG. 1. In this embodiment, the core conversion device 12 further includes a clock controller 120, an instruction controller 122, a state register set 124 and a data conversion device 126. The clock controller 120 receives a clock signal (CCK, CCK#) from the DDR device and converts the signal into a clock signal (MCK) suitable for operating between the conversion device 10 and the SDR device. The instruction controller 122 picks up DDR instructions (including CCS, CRAS, CCAS, CBA and so) and converts to corresponding SDR instructions (MCS, MRAS, MCAS, MBA and so on). The data conversion device 126 is triggered when data read/write instruction is executed. The state register set 124 is used for holding the data held by a mode register set (MRS) and an extended mode register set (EMRS) inside the DDR interface during operation. The data conversion device 126 is responsible for transforming DDR data into an SDR data mode, and vice versa.

In FIG. 1, the data conversion device 126 further includes a data mask and strobe controller 1260, an SDR-to-DDR data converter 1262 and a DDR-to-SDR data converter 1264. The data mask and strobe controller 1260 receives a DDR data mask signal (DM signal) and a DDR data strobe signal (DQS signal) from the DDR device. Inside the data mask and strobe controller 1260, the DDR data mask signal is converted to an SDR mask signal (DQM) while the DDR data strobe signal is converted to a data signal for accessing the SDR device. In addition, the data mask and strobe controller 1260 is able to transmit a DDR data strobe signal to the DDR device according to the instruction provided by the instruction controller 122. The DDR-to-SDR data converter 1264 converts serial signal from the DDR device into a parallel signal and transmits the parallel signal to two separate SDR devices according to the instruction provided by the instruction controller 122. The SDR-to-DDR data converter 1262 converts data signals from two separate SDR devices into a serial signal and transmits the serial signal to the DDR device according to the instruction provided by the instruction controller 122.

Since DDR is able to send two bits in a cycle while SDR is able to send only one bit in a cycle, a DDR module has a processing speed and performance better than an SDR module. In the aforementioned embodiment, a design using one DDR device to correspond with every pair of SDR devices is selected in the SDR and the DDR conversion devices. Anyone familiar with the technologies may notice that a design of the SDR and DDR devices using one DDR device for each SDR device is also feasible, but there is an obvious drop in performance. To maintain an identical operating efficiency, the SDR device should operate at twice the frequency of the DDR device. However, raising the operating frequency for the SDR device is not only difficult, but also increases production cost. In this invention, two sets of SDR modules are preferably used if the effect of a one set of DDR modules is desired.

Figure 2:
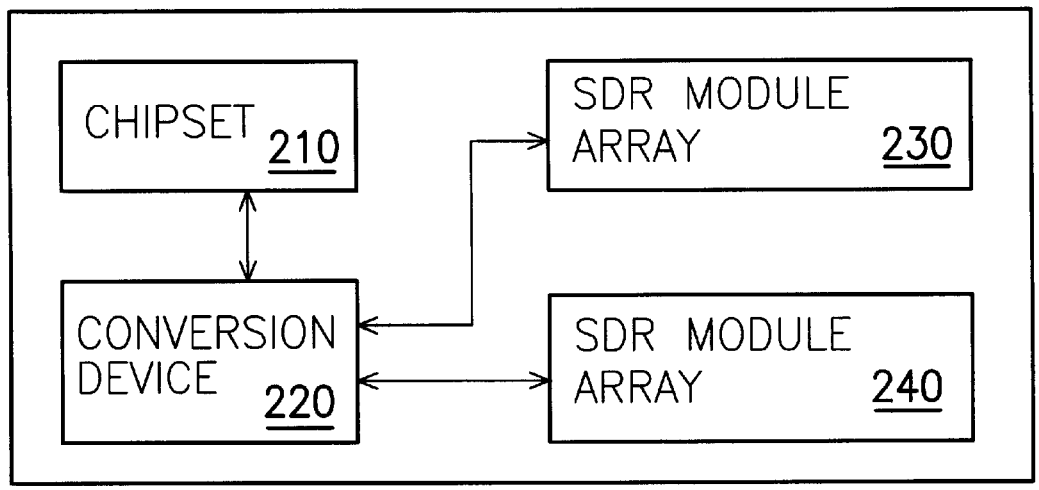
FIG. 2 is a block diagram showing an interface card according to one preferred embodiment of this invention.

FIG. 2 is a block diagram showing an interface card according to one preferred embodiment of this invention. As shown in FIG. 2, the interface card 20 includes a chipset 210 that supports DDR modules, a conversion device 220 and a pair of SDR module arrays 230 and 240. To simplify the diagram, connections between the DDR interface device and the SDR interface device of the conversion device 220 and the chipset 220 and the SDR module arrays 230 and 240 are represented by arrow lines. With these type of connections, SDR modules can also be used on an interface card originally designed to support only DDR modules.

Figure 3:
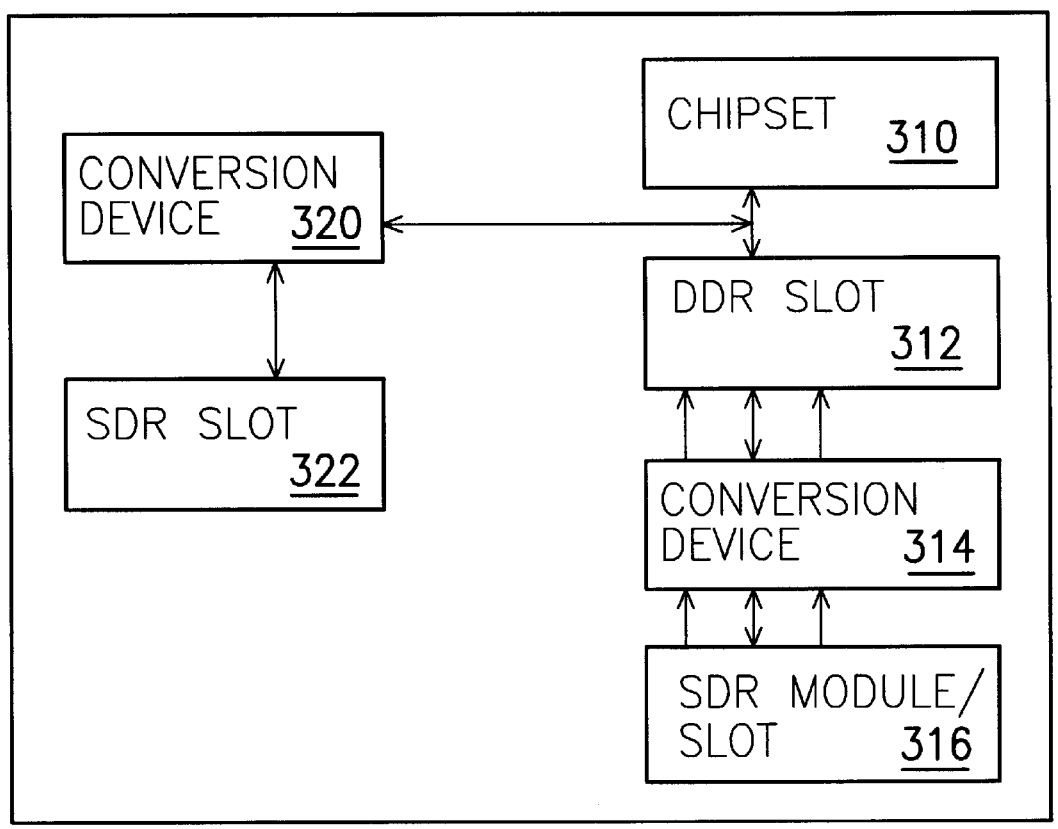
FIG. 3 is a block diagram showing a motherboard according to one preferred embodiment of this invention.

FIG. 3 is a block diagram showing a motherboard according to one preferred embodiment of this invention. As shown in FIG. 3, the motherboard 30 includes a chipset 310 that supports DDR modules, a DDR slot 312, two conversion devices 314 and 320, an SDR module/slot 316 and an SDR slot 322.

Note that it is not essential to have both conversion devices 314 and 320 present at the same time. Both devices 314 and 320 are drawn to explain the existence of two states. However, one of the states can be provided by plugging the conversion device 314 into the DDR slot 312 and providing the SDR module/SDR slot 316 on the conversion device 314. Another state is provided by directly coupling the conversion device 320 with the chipset 310 and providing an SDR module/SDR slot 322 on the conversion device 320.

Both methods enable a chipset 310 that supports only DDR modules to support both DDR modules and SDR modules simultaneously.

In actual applications, DDR modules can be plugged onto the DDR slots 312 and SDR modules can be plugged into the SDR slots 322. The DDR modules can transmit signals to the chipset 310 while the SDR modules can transmit signals to the conversion device 320 and convert into DDR chipset identifiable signals before sending to the chipset 310. The arrangement also permits the sole use of SDR modules because SDR signal can be converted to DDR signal in the conversion device 320 or 316 before transmitting to the chipset 310.

Figure 4:
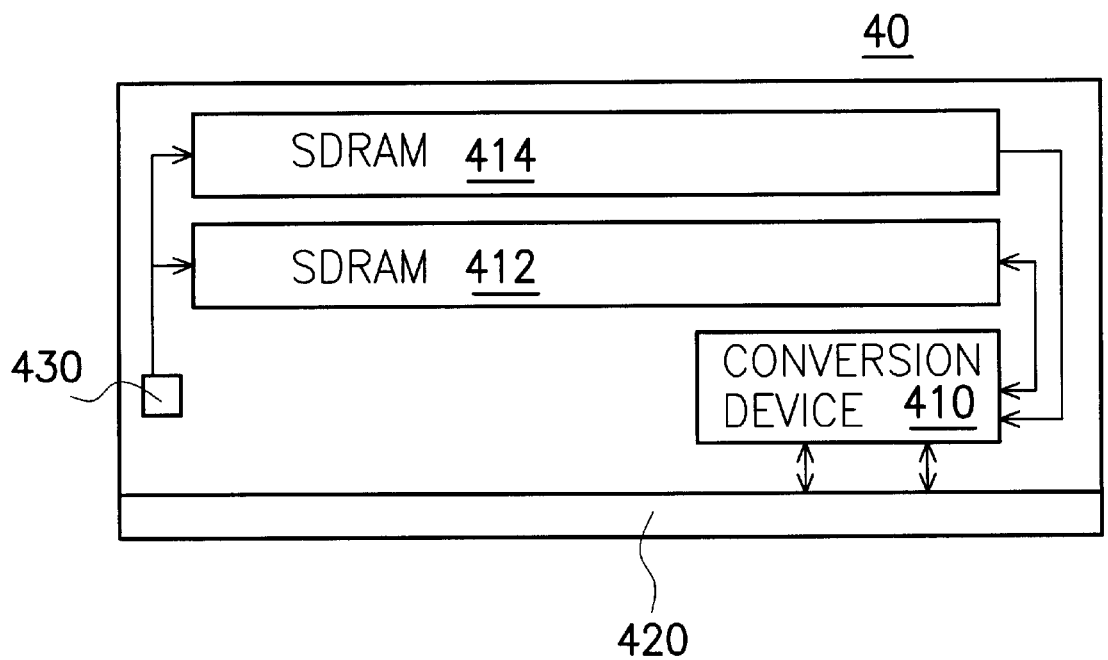
FIG. 4 is a block diagram showing a memory module according to one preferred embodiment of this invention.

FIG. 4 is a block diagram showing a memory module according to one preferred embodiment of this invention. As shown in FIG. 4, the memory module 40 includes a conversion device 410, SDRAM 412 and 414, DDR interface gold fingers 420 and a transformer 430. The DDR interface device and the SDR interface device inside the conversion device 410 are similar to the one shown in FIGS. 2 and 3 having connections with other devices by connecting lines. The DDR interface device and the DDR interface gold fingers 420 are connected. Since SDR and DDR has different operating voltages, with DDR operating at 2.5 V while the SDR operating at 3.3 V, a system that supports DDR operating mode cannot provide the necessary voltage for operating the SDR. Hence, a transformer 430 is erected so that external voltage is converted to a voltage (about 3.3 V) for operating the SDRAM 412 and 414. The transformer 430 can connect directly with a power source of the computer or provide by a power line that leads to the DDR slot in the original motherboard design.

Figure 5:
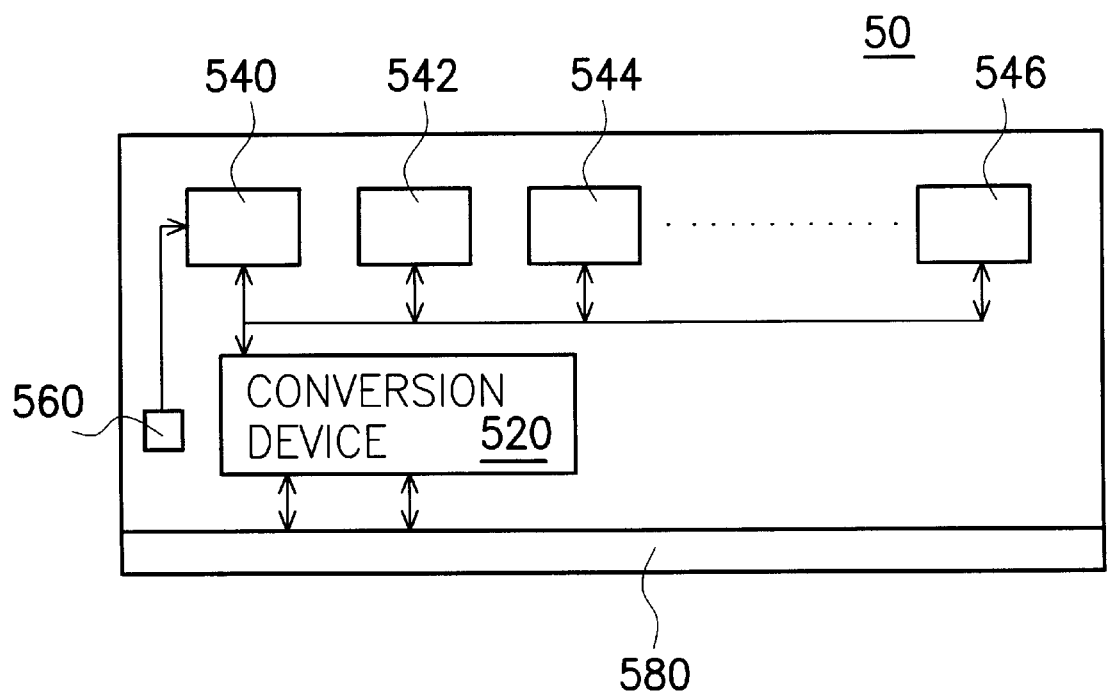
FIG. 5 is a block diagram showing a memory module according a second preferred embodiment of this invention.

FIG. 5 is a block diagram showing a memory module according a second preferred embodiment of this invention. The operating mode is similar to the one shown in FIG. 4. The main difference is that the SDRAM in FIG. 4 is replaced by SDR modules 540, 542, 544 . . . 546.

Figure 6:
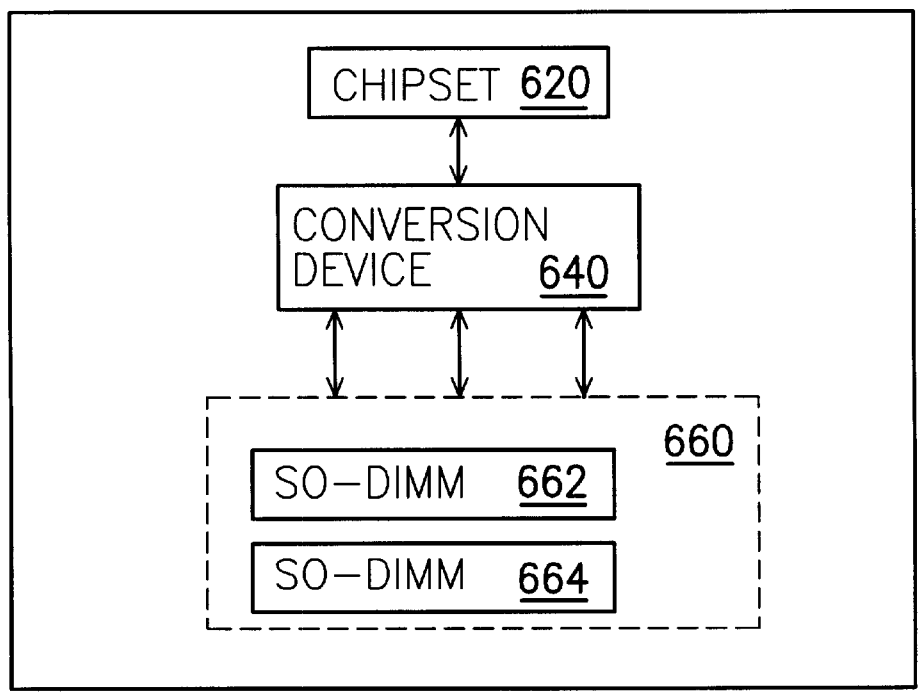
FIG. 6 is a block diagram showing a motherboard of a portable computer according to one preferred embodiment of this invention.

FIG. 6 is a block diagram showing a motherboard of a portable computer according to one preferred embodiment of this invention. This embodiment differs from the embodiment in FIG. 3 in that a portable motherboard 60 uses RAM having a special specification. Hence, SO-DIMM memory arrays are coupled to the SDR interface of the conversion device. Since operations of the motherboard are identical to the one shown in FIG. 3, detailed description is omitted.

Figure 7:
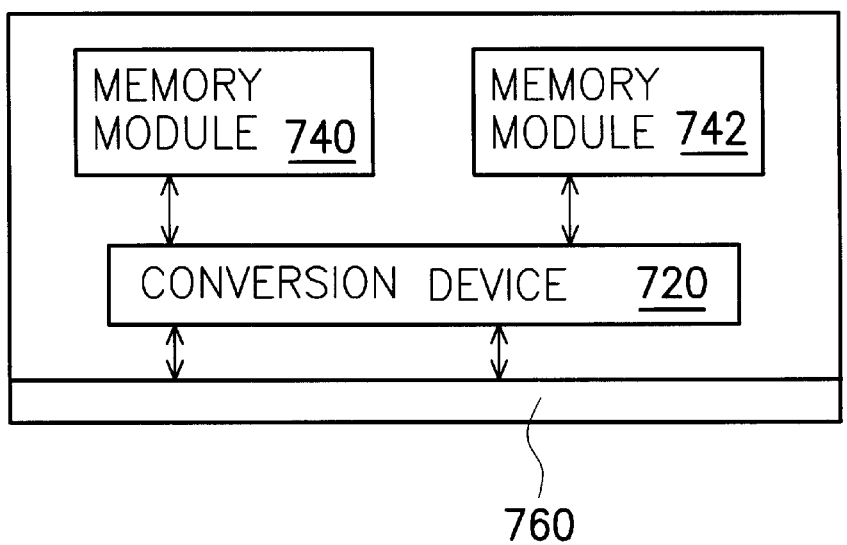
FIG. 7 is a block diagram showing a memory module of a portable computer according to one preferred embodiment of this invention.

FIG. 7 is a block diagram showing a memory module of a portable computer according to one preferred embodiment of this invention. This embodiment is almost identical to the embodiment shown in FIG. 5. The main difference is that memory modules 70 having special specification are used inside a portable computer. Therefore, to introduce a conversion device 720 into the memory module 70, height of the memory module 70 will be increased. This may lead to possible structural problems, but circuit design is largely unaffected. Furthermore, because SO-DIMM and SDR modules 740 and 742 operate under an identical voltage, no additional transformer is required.

Note that the interchangeability of SDR and DDR is stressed all along and very little has been said about concurrent use of SDR and DDR modules. However, according to the embodiment shown in FIG. 3, if the conversion device 314 is removed and SDR modules and DDR modules are plugged into the SDR slots 322 and the DDR slots 312 respectively, both SDR slots and the DDR slots 312 can operate at the same time. Hence, SDR modules and DDR modules can operate normally together.

In summary, this invention utilizes the establishment of a conversion channel between DDR and SDR modules so that the SDR modules can operate efficiently under a DDR supporting system or device.

For the user of the conversion device, new DDR modules need not be purchased in order to have DDR module efficiency. The existing SDR modules can be re-used in the system, thereby saving the cost for memory upgrading. Furthermore, existing SDR modules, the conversion device of this invention and DDR modules can be used together to enhance performance.

For semiconductor manufacturers, cheaper SDR chips can be used in printed circuit boards such as interface cards and motherboards if the conversion device of this invention is employed. Despite having cheaper SDR chips, the printed circuit board has the quality and performance equivalent to the one using the more expensive DDR chips. Moreover, no matter if SDR modules and DDR modules are used together or only SDR modules are used, a performance identical to using all DDR modules would be produced. Thus, such products can enhance market competitiveness.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A synchronous dynamic random access memory (SDR), and double data rate dynamic random access memory (DDR) conversion device, comprising:

a DDR interface device for exchanging signals with a DDR device;

an SDR interface device for exchanging signal with an SDR device;

a clock controller for receiving a clock signal from the DDR device and converting the signal into a clock signal suitable for operating the conversion device and the SDR device;

an instruction controller for receiving DDR instructions, converting DDR instructions into corresponding SDR instructions and triggering a data conversion mechanism when a read/write instruction is executed;

a state register set for holding data from a mode register set (MRS) and an extended mode register set (EMRS) used by the DDR interface during operation; and a data conversion device for converting DDR data state into a data state suitable for SDR and SDR data state into a data state suitable for DDR.

2. The conversion device of claim 1, wherein the data conversion device further includes:

a data mask and strobe controller for receiving a DDR data mask signal and a DDR strobe signal from the DDR device, and converting the DDR data mask signal into an SDR mask signal and the DDR data strobe signal into a signal for accessing the SDR device, and transmitting the DDR data strobe signal to the DDR device according to an instruction provided by the instruction controller;

a DDR-to-SDR data converter for converting a serial signal from the DDR device into a parallel signal and transmitting the parallel signal to two separate SDR devices; and an SDR-to-DDR converter for converting the data signals from two SDR devices into a serial signal for the DDR device and transmitting the serial signal to the DDR device according to an instruction provided by the instruction controller.

3. A synchronous dynamic random access memory (SDR) and double data rate dynamic random access memory (DDR) conversion device, comprising:
   a DDR interface device for exchanging signals with a DDR device;
   an SDR interface device for exchanging signals with an SDR device; and
   a core conversion device for converting DDR instructions and data into SDR instructions and data and transmitting the SDR instructions and data to the SDR device through the SDR interface device as well as converting SDR instructions and data into DDR instructions and data and transmitting the DDR instructions and data to the DDR device through the DDR interface device.

4. An interface card that uses a SDR and DDR conversion device on a circuit board for supporting DDR modules, wherein the circuit board at least includes a chipset for supporting DDR, comprising:
   at least one SDR module array; and
   an SDR and DDR conversion device that includes:
      a DDR interface device connected to the circuit board for exchanging signals with the chipset;
      an SDR interface device connected to the SDR module array for exchanging signals with the SDR module array; and
      a core conversion device for converting DDR instructions and data into SDR instructions and data and transmitting the SDR instructions and data to the SDR module array through the SDR interface device as well as converting SDR instructions and data into DDR instructions and data and transmitting the DDR instructions and data to the chipset through the DDR interface device.

5. A motherboard that uses a SDR and DDR conversion device, comprising:
   a chipset for supporting DDR modules; and
   a first SDR and DDR conversion device, including:
      a first DDR interface device for exchanging signals with the chipset;
      a first SDR interface device for providing at least one SDR module slot; and
      a first core conversion device for converting DDR instructions and data into SDR instructions and data as well as converting SDR instructions and data into DDR instructions and data;
   wherein when at least one SDR module is used, the SDR module transmits the SDR data to the first core conversion device through the SDR module slot and the first SDR interface device, and the first conversion device converts the SDR data into DDR data and instructions, and sends it to the chipset via the first core conversion device, and, similarly, the first core conversion device also converts the DDR instructions and data from the chipset into SDR instructions and data and transmits the SDR instructions and data to the SDR module via the first SDR interface device.

6. The motherboard of claim 5, wherein board further has:
   a DDR module slot for connecting a DDR module and transmitting DDR instructions and data between the chipset and the DDR module, and the DDR module works together with the first SDR and DDR conversion device.

7. The motherboard of claim 6, wherein the motherboard further has:
   a second SDR and DDR conversion device that includes a second DDR interface device installed on the DDR module slot, a second SDR interface device that provides at least one SDR module slot for connecting an SDR module, and
   a second core conversion device for converting DDR instructions and data into SDR instructions and data, and transmitting the SDR instructions and data to the SDR module via the second SDR interface device as well as converting SDR instructions and data into DDR instructions and data and transmitting the DDR instructions and data to the chipset on the motherboard via the second DDR interface device.

8. A memory module that uses an SDR and DDR conversion device and suitable for connecting to a DDR module slot, comprising:
   at least two SDR module slots;
   a DDR interface device for connecting the memory module and the DDR module slot and carry out signal exchanges;
   an SDR interface device for connecting the SDR module slots and carrying out signal exchanges; and
   a core conversion device for converting DDR instructions and data into SDR instructions and data, and transmitting the SDR instructions and data via the SDR interface device as well as converting SDR instructions and data into DDR instructions and data and transmitting the DDR instructions and data via the DDR interface device.

9. The memory module of claim 8, wherein the module further includes:
   a transformer for transforming the voltage provided by an external power source into a voltage suitable for operating the SDR module slot.

10. The memory module of claim 9, wherein the transformer converts the voltage provided by a DDR module slot into a voltage suitable for operating the SDR module slot.

11. The memory module of claim 7, wherein a pair of SDR modules is directly connected to the module instead of having a pair of SDR module slots for connecting two SDR modules.

12. A portable computer motherboard having an SDR and DDR conversion device, comprising:
   a chipset that support the operations of DDR modules; and
   an SDR and DDR conversion device that includes a DDR interface device for exchanging signal with the chipset, an SDR interface device that provides at least two SO-DIMM slots, and a core conversion device that converts DDR instructions and data into SDR instructions and data, and transmits the SDR instructions and data via the SDR interface device as well as converts SDR instructions and data into DDR instructions and data and transmits the DDR instructions and data via the DDR interface device.

13. The portable computer motherboard of claim 12, wherein the SDR interface device is coupled to an SDR array and signals are exchanged between the SDR array and the SO-DIMM.

14. A portable computer memory module that uses an SDR and DDR conversion device, comprising:
   at least two memory modules; and
   an SDR and DDR conversion device that includes a DDR interface device for exchanging signals with a SO-DIMM slot, an SDR interface device for exchanging signals with memory modules and a core conversion device that converts DDR instructions and data into SDR instructions and data and transmits the SDR instructions and data via the SDR interface device as well as converts SDR instructions and data into DDR instructions and data and transmits the DDR instructions and data via the DDR interface device.

* * * * *